United States Patent [19]
Owens

[11] 3,892,913
[45] July 1, 1975

[54] METHOD OF SETTING THE 4.5 MHz TRAP IN A TELEVISION RECEIVER

[75] Inventor: James Herbert Owens, Dallas, Tex.

[73] Assignee: RCA Corporation, New York, N.Y.

[22] Filed: May 7, 1973

[21] Appl. No.: 357,674

Related U.S. Application Data

[62] Division of Ser. No. 187,070, Oct. 6, 1971.

[52] U.S. Cl. ............................................ 178/5.8 R
[51] Int. Cl. ............................................ H04n 5/00
[58] Field of Search ......... 178/5.8 R, 5.8 A, 5.4 TE, 178/DIG. 4; 358/10; 324/76 R; 340/177 R

[56] References Cited

OTHER PUBLICATIONS

Motorola, Inc., "Motorola Service Manual No. 68P65155A08", 1968, p. 45.

*Primary Examiner*—Robert L. Richardson
*Assistant Examiner*—Mitchell Saffian
*Attorney, Agent, or Firm*—Edward J. Norton; William Squire

[57] ABSTRACT

A method is provided for setting a 4.5 MHz trap to its lowest output value in the presence of a plurality of spurious cross product modulated signals by providing substantial increase in gain of the trap output signal through a series resonant circuit coupled to a peak detector.

4 Claims, 4 Drawing Figures

INVENTOR.
James H. Owens
BY
ATTORNEY

INVENTOR.
James H. Owens
BY
William [signature]
ATTORNEY

METHOD OF SETTING THE 4.5 MHZ TRAP IN A TELEVISION RECEIVER

This is a division, of application Ser. No. 187,070, filed 10/6/71.

BACKGROUND OF THE INVENTION

This invention relates generally to high frequency probes, and more particularly, to demodulating probes.

In checking and adjusting color television receivers, for example, the frequency response curves of circuits under test are viewed on an oscilloscope, one test being the adjustment of the 4.5 $mH_z$ trap. This trap is used to prevent beat patterns in the video picture caused by a 920 $kH_z$ difference frequency being generated in the chromasection of the receiver when 4.5 $mH_z$ intermodulates with the 3.58 $mH_z$ color subcarrier. This trap is usually located between the second detector and the first video amplifier ahead of the chroma take-off point.

Presently, test signals for tuning the 4.5 $mH_z$ trap have to be injected at specific points in the circuit, which differ from one receiver to another, and which are often difficult to locate and identify. Scope take off points also vary from set to set; and in some cases have to make use of frequency selective components in the chroma circuit. Therefore, if there are other circuit problems in the circuitry, this procedure will not produce the desired effect until the outside problems are cleared.

One test signal used is an IF carrier which is amplitude modulated with 4.5 $mH_z$ and an audio frequency usually in the 400 to 600 Hertz range. This signal can be injected almost anywhere from the mixer input in the tuner up to the final IF amplifier stage or device. The IF circuits are responsive to the carrier and therefore all three signals reach the second detector. At the second detector, the signals are rectified or detected, and many intermodulation products are generated including all the fundamental frequencies and their sum and difference frequencies. As a result, there are at least thirteen different frequencies at the output of the second detector, which combine to produce a composite or mish-mash pattern on an oscilloscope connected to the output of the second detector. Obviously, the composite pattern cannot be nulled by the adjustment of the 4.5 $mH_z$ trap which can attenuate only the 4.5 $mH_z$ signal and its audio (400 to 600 $H_z$) sidebands. Neither can the 4.5 $mH_z$ trap be tuned by visual indications on the face of the picture tube, since the video amplifier will pass the audio component, and the chrominance amplifier will pass the 4.5 $mH_z$ signal with its audio sidebands, and proper tuning of the trap cannot eliminate all of these signals. So, with the IF carrier amplitude modulated with 4.5 $mH_z$ and audio, proper tuning of the 4.5 $mH_z$ trap requires connecting the oscilloscope into the chrominence amplifier at a point beyond at least one of the frequency-selected coils or transformers which attenuates all signals except the 4.5 $mH_z$ and its audio sidebands, thus allowing the scope pattern to be nulled when the 4.5 $mH_z$ trap is properly tuned. Unfortunately, this requires that the chrominance amplifier and its components are in good operating condition which is not the usual case.

Many different servicing procedures and circuits, including the use of probes, have been developed to resolve these problems and have met with little success.

One of these systems includes injection of a 4.5 $mH_z$ signal modulated by 600 $H_z$ at the input to the last IF stage of the color television receiver. There are no byproducts which the trap will not take out with the scope connected to the input of the video amplifier. However, the circuitry might not always pass the signals into the trap, in which case, no pattern is obtained at all to be nulled. Sometimes there are cases where the last IF amplifier device is shielded so it cannot be reached by the injection probe. Then it will become necessary to inject the signal at or close to the trap but the prior art probes and accompanying cable capacitance therein can detune the trap.

Still another system provides for injection into the IF amplifier of a picture carrier and a sound carrier, one or both of which are amplitude-modulated by an audio signal. The two carriers differ in frequency by 4.5 $mH_z$, thus a 4.5 $mH_z$ signal is developed by cross-modulation in the IF amplifier. But the second detector generates a multitude of cross-modulation products, therefore the oscilloscope has to be connected into the chrominance amplifier beyond at least one frequency-selective coil or transformer to remove all frequencies except 4.5 $mH_z$ and its audio sidebands to permit proper tuning of the 4.5 $mH_z$ trap. Even this is not an efficient system because the chrominance amplifier is designed to pass a band between 3 and 4 $mH_z$, and is not very efficient at 4.5 $mH_z$.

SUMMARY OF THE INVENTION

A passive demodulating probe is provided in accordance with the present invention which comprises a series L-C resonance circuit having a pair of input terminals and a peak detector circuit having a pair of input and a pair of output terminals. The peak detector input terminals are coupled across either the inductor or capacitor for demodulating the signal resonating in the resonant circuit.

In accordance with a feature of the probe of the present invention the peak detector circuit includes a voltage multiplier circuit for further increasing the gain of the probe.

IN THE DRAWINGS

DESCRIPTION OF THE PREFERRED EMBODIMENT

Figure 1:
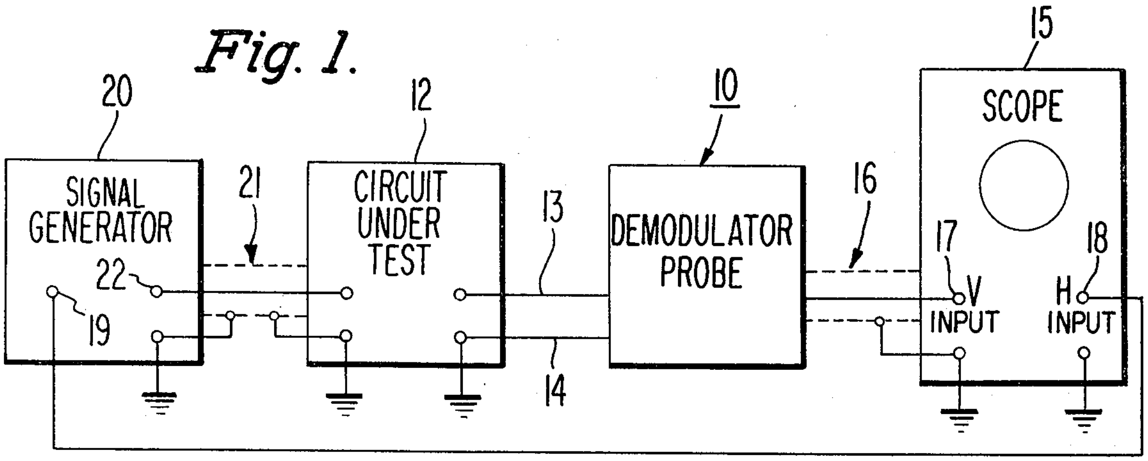
FIG. 1 is a block diagram of a circuit utilizing the probe of the present invention.

In FIG. 1 there is shown a frequency-selective demodulator probe 10 in accordance to the present invention having its input connected to circuit under test 12 through leads 13 and 14, lead 14 being connected to a reference potential such as ground. The output of the probe is connected to an oscilloscope 15 by coaxial cable 16 whose outer shield is shown by dotted lines and whose inner conductor is shown by a solid line. The dotted outer shield of the coaxial cable is connected to a reference potential such as ground and to the ground input terminal of the scope. The solid conductor of cable 16 is connected to the vertical deflection circuit input terminal 17 of oscilloscope 15. Horizontal sweep circuit terminal 18 of the oscilloscope 15 is connected to an output terminal 19 of signal generator 20 for the purpose of sweeping oscilloscope 15 at the same repetition frequency applied to the circuit under test 12. The input of the circuit under test is connected by coaxial cable 21 to output terminal 22 of signal generator 20 with the shield of the coaxial cable, shown in dotted lines, connected to a reference potential such as ground.

Figure 3:
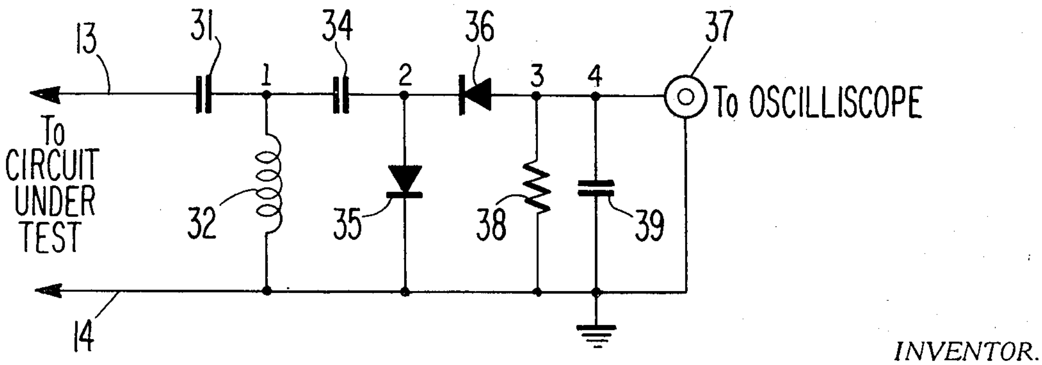
FIG. 3 is a schematic diagram of the circuitry of the demodulator probe in accordance with the present invention.

In FIG. 3, there is shown a schematic diagram of the circuitry of the demodulator probe 10 in accordance with the present invention. The probe 10 includes a series resonant circuit including capacitor 31 and inductor 32. This series resonant circuit is tuned to the bandwidth of a trap or circuit provided to attenuate a signal of a given frequency in the circuit 12 under test. The free terminal of capacitor 31 is connected to lead 13 while the free terminal of inductor 32 is connected to lead 14 at the same time that a voltage gain is provided at the junction 33 of capacitor 31 and inductor 32, the undesired cross products of the signal at the output of the trap provided by the circuit under test, for example, at the second detector in a color television receiver, are substantially eliminated. The signal at junction 33 manifests substantially only the bandwidth of the signal to which the trap in the circuit 12 under test is responsive.

A capacitor 34 is connected to junction 33 and to the anode of diode 35 and the cathode of diode 36. The other terminal of diode 36 is coupled to the center conductor of coaxial connector 37 and to resistor 38 and capacitor 39. The outer terminal or ground terminal of coaxial connector 37 is coupled to the other side of capacitor 39, the cathode of diode 35, resistor 38, and to lead 14. Capacitors 34 and 39, resistor 38 and diodes 35 and 36 serve as a peak detector and voltage doubler for the signal at junction 33. Diode 35 serves to charge capacitor 34 in one polarity, while capacitor 39 is charged during the next half cycle through diode 36. This voltage doubling action, in additon to the gain of approximately 10 as provided by the series resonant circuit of capacitor 31 and inductor 32, provides a voltage gain of more than twenty for the signal applied across leads 13 and 14. Thus, when a low level attenuated signal is applied to the input terminals 13 and 14 of probe 10 and the level of the signal is to be even further attenuated by alignment of the circuit under test, the relatively high voltage gain provided by the demodulator probe of the present invention permits the signal applied to the oscilloscope at connector 37 to be utilized for visually adjusting the circuit under test by an operator. As provided by the invention, diodes 35 and 36, resistor 38 and capacitors 34 and 39 simultaneously serve both as a peak detector and voltage multiplier for the signal applied to leads 13 and 14.

Figure 2:
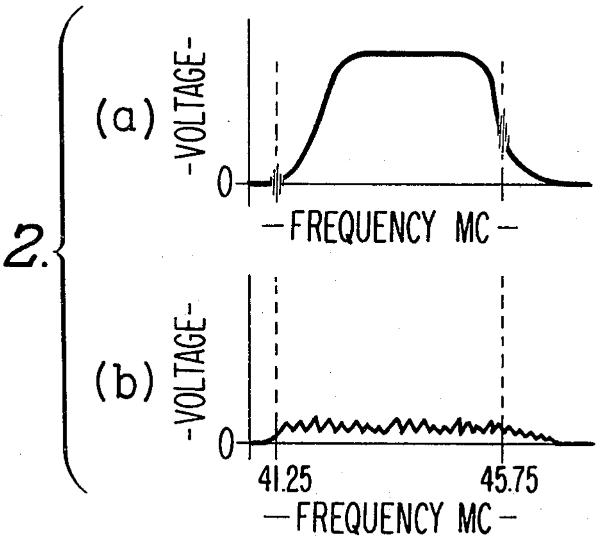
FIG. 2 is a graph of frequency response curves used to explain the operation of the demodulator probe.

In FIG. 2, curve *a*, there is shown a typical frequency response curve at the output of circuit under test 12, when the signal generator is used to sweep the desired range of frequencies. This curve usually includes a marker signal at 41.25 $mH_z$ which is the sound carrier, and a marker signal at the 45.75 $mH_z$, which is the picture carrier, it being understood that these marker signals are required for alignment of the circuit only under test. One product of the 41.25 and 45.75 $mH_z$ signals is the 4.5 $mH_z$ signal which is to be attenuated by a trap in circuit under test 12. In this step, the sweep signal is turned off, and one or both of the carrier signals is modulated with an audio signal, preferably at 600 $H_z$.

In practice, in aligning a 4.5 $mH_z$ trap in a color television receiver, signal generator 20 supplies an IF carrier signal plus 4.5 $mH_z$ with audio frequency modulation or a 45.75 $mH_z$ picture carrier plus a 41.25 $mH_z$ sound carrier with audio modulation. These signals may be injected anywhere within the IF amplifier of the receiver. With the probe coupled advantageously at the second detector, only the 4.5 $mH_z$ signal passed by the circuit under test 12, namely, the 4.5 $mH_z$ trap is displayed on scope 15.

It will now be understood that when demodulator probe 10 is connected in circuit 12 as shown in FIG. 1 and when circuit 12 is fed signals by signal generator 20, a beat pattern curve b of FIG. 2 will appear on the face of oscilloscope 15. The waveform curve of FIG. 2 manifests the demodulated audio signal. Thus, it will be appreciated that the circuit under test provided to attenuate a signal of a given frequency may be aligned to provide a greatly attenuated signal at that frequency and yet the demodulated signal as shown by curve b of FIG. 2 will be provided so that the circuit under test may be adjusted to its maximum attenuation position. This demodulated signal is provided clear and free of any of the multitudes of cross product signals which ordinarily are present at the test point in the circuit under test which cross products otherwise would contribute to the undependable adjustment of that circuit.

Figure 4:
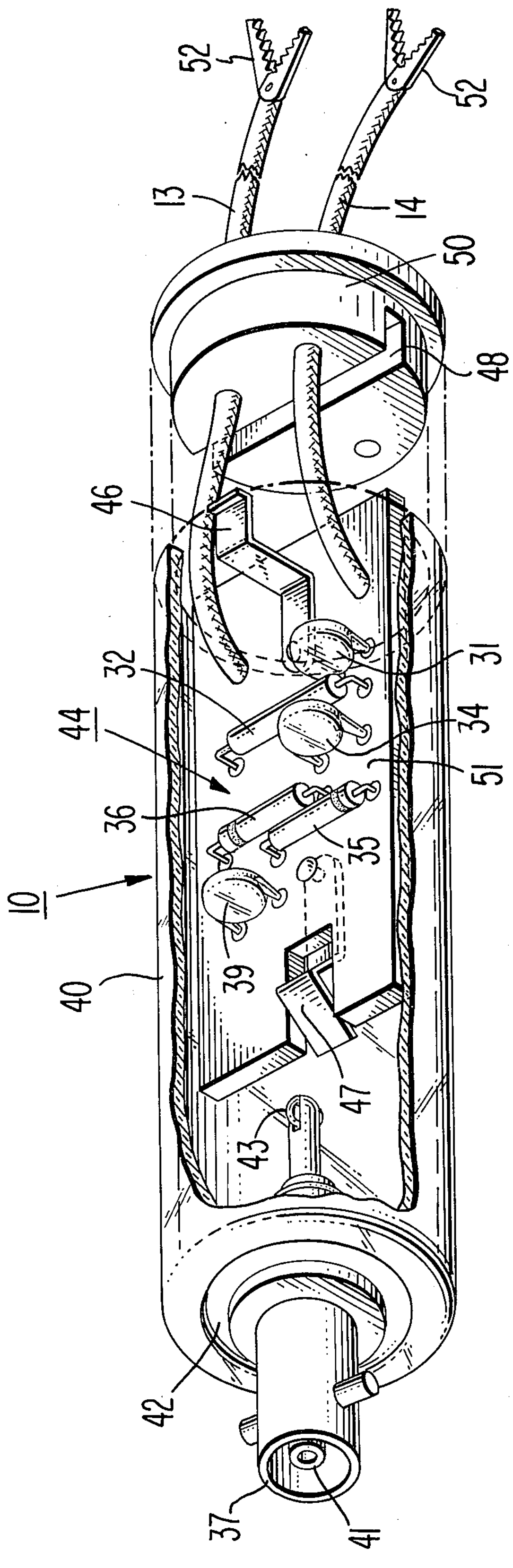
FIG. 4 is a cutaway perspective view of the demodulator probe of the present invention.

In FIG. 4 there is shown the actual construction of the demodulator probe 10 in accordance with the present invention adapted to demodulate the 4.5 $mH_z$ signal modulated with a 600 $H_z$ audio signal. It will be understood that these frequencies are merely given by way of example and are not intended in a limiting sense in either number or kind. The bandwidth of the signal to be demodulated and the frequency of the signal by which the signal is modulated are limited only by the practical applications of the circuit under test. The circuitry and components of the demodulator probe 10 are contained in a casing 40. Casing 40 is an elongated tubular metallic structure having a cylindrical cross section. The front wall 42 of the casing is coupled to coaxial connector 37 such that the outer conductor or ground conductor of coaxial connector 37 is conductively connected to casing 40, while the inner conductor 41 extends through the frontal wall 42 of the casing and being insulated from the casing 40 electrically connects to a contact spring 43 within the casing 40.

Enclosed by elongated casing 40 is a printed circuit board assembly 44. On this printed circuit board are all the components of the circuit of FIG. 3. These components are interconnected by suitable printed circuitry on the opposite side of the board, not shown. Three capacitors, an inductor and two diodes are shown in this view while resistor 38 is on the opposite side of the board and is not shown. The inductor 32, diode 35, capacitor 39 and resistor 38, not shown, are coupled to a reference potential or ground conductor on the opposite side of the board which is conductively connected to terminal extension 46.

Spring contact 47 at the forward end of the board is coupled to diode 36 for interconnection with the center conductor spring contact 43 on coaxial connector 37. Lead 13 is a suitably insulated conductive wire coupled to capacitor 31, while lead 14 is a similarly insulated conductive wire conductively connected to the ground conductive path of the printed circuit board. Slot 48 is provided in end cap 50 which is a suitable insulating material. Printed circuit board 51 is inserted in slot 48 which holds the printed circuit board in alignment in casing 40 such that contacts 47 and 43 make electrical contact with each other when the assembly is inserted in casing 40. When the assembly 44 is inserted in slot 48 of cap 50, the assembly board is assembled to casing 40 such that terminal 46 is in electrical contact with casing 40 between the cap and the casing. Thus the casing, the outer conductor of connector 37 and the ground conductor of printed circuit board 51 form a continuous conductive path. Suitable terminations 52 are coupled to leads 13 and 14. Therefore, it will be seen that demodulator probe 10 can be readily connected to the circuit under test by terminations 52 and to oscilloscope 15 by connector 37.

Thus there has been shown and described in accordance with the present invention a demodulator probe adapted to demodulate a modulated signal to be attenuated by a circuit under test. The point at which the attenuated signal is to be detected by the demodulator probe may include a plurality of signals in addition to the attenuated signal. However, the demodulator probe selectively detects only the signal which is actually attenuated by the circuit under test, by-passing all other signals, and at the same time provides markedly increased gain in the attenuated signal thereby providing means for easily identifying this attenuated signal.

To obtain the demodulated signal, the demodulator probe is inserted between the circuit under test and the oscilloscope on which the demodulated output signal is to be observed. The circuit under test, including a trap or attenuating circuit, is inserted between a signal generator and the demodulator probe of the present invention. The output of the demodulator probe is applied to the vertical deflection circuit of an oscilloscope and the horizontal circuit of the oscilloscope is swept at a frequency derived from the signal generator. The resonant circuit of the demodulator probe is tuned to the particular frequency at which the attenuator means of the circuit under test is also tuned. The demodulated signal observed on the oscilloscope can be reduced in amplitude by increasing the attenuation of the circuit under test for the given bandwidth of the signal to be filtered. However, since the signal to be attenuated includes a modulated signal, the demodulated signal is always present on the oscilloscope for enabling an operator to adjust the attenuator means in the circuit under test to provide the lowest output of that attenuator.

What is claimed is:

1. A method of setting the 4.5 MHz trap in a television receiver comprising:

injecting an audio modulated signal having a 4.5 MHz beat frequency within the IF amplifier of said receiver, observing the amplitude of the output signal of said trap during said injecting step, and adjusting the trap to cause said output signal to be set to a minimum level, said observing step including the steps of applying a series resonant circuit resonating at 4.5 MHz at the output of said trap to provide a resonating signal at 4.5 MHz and detecting said resonating signal to provide a signal manifesting the amplitude of said output signal.

2. The method of claim 1 wherein said detecting step includes the step of applying said detected signal to an oscilliscope.

3. A method of setting the 4.5 MHz trap in a television receiver, comprising:

providing a 45.75 MHz signal, providing a 41.25 MHz signal, modulating one of said signals with a signal at audio frequency, injecting said modulated one signal and the other of said provided signals within the IF amplifier of the receiver, applying a series resonant circuit having a resonance of 4.5 MHz at the output of said trap, detecting the signal resonating in said resonant circuit, applying said detected signal to means for indicating the magnitude of the amplitude of said detected signal, and adjusting said trap to minimize the magnitude of said detected signal amplitude.

4. A method of setting the 4.5 MHz trap in a television receiver comprising:

applying a series resonant circuit resonating at 4.5 MHz at the output of said trap to provide an output signal resonating at 4.5 MHz, detecting said resonating signal to provide a signal manifesting the amplitude of said output signal, observing by the use of said detected signal the amplitude of the output signal of said trap during said application of said resonant circuit at said trap, and adjusting the trap to cause the output signal to be set to a minimum level.

* * * * *